United States Patent [19]

Yasue et al.

[11] Patent Number: 4,819,777
[45] Date of Patent: Apr. 11, 1989

[54] SYSTEM FOR INTEGRALLY CONTROLLING AN ENGINE AND AN AUTOMATIC TRANSMISSION HAVING A DEVICE FOR DETERMINING ENGAGEMENT OF THE LOCKUP CLUTCH WHEN A CERTAIN TIME DURATION ELAPSES AFTER OUTPUT OF AN ENGAGEMENT SIGNAL

[75] Inventors: Hideki Yasue; Kagenori Fukumura, both of Toyota, Japan

[73] Assignee: Toyota Jidosha Kabushiki Kaisha, Aichi, Japan

[21] Appl. No.: 36,467

[22] Filed: Apr. 9, 1987

[30] Foreign Application Priority Data

Apr. 14, 1986 [JP] Japan .................. 61-85534

[51] Int. Cl.$^4$ .................. B60K 41/28; F16H 45/02
[52] U.S. Cl. .................. 192/0.062; 192/3.29; 74/857
[58] Field of Search .................. 192/0.062, 0.092, 3.28, 192/3.29, 30 W, 0.084, 0.096, 3.3, 3.58; 74/857, 860, 732

[56] References Cited

U.S. PATENT DOCUMENTS 4,373,619  2/1983  Schritt et al. .................. 192/3.28 X
4,386,687  6/1983  Chevalier et al. .................. 192/3.3
4,403,527  9/1983  Mohl et al. .................. 74/851
4,422,353  12/1983  Suga et al. .................. 192/3.58 X
4,428,467  1/1984  Hiramatsu et al. .................. 192/0.092 X

FOREIGN PATENT DOCUMENTS 55-69738  5/1980  Japan .
61-55466  3/1986  Japan .................. 193/3.3

Primary Examiner—Rodney H Bonck
Assistant Examiner—Richard M. Lorence
Attorney, Agent, or Firm—Parkhurst, Oliff & Berridge

[57] ABSTRACT

Determination of the engagement of a lockup clutch is performed in a system for integrally controlling an automatic transmission and an engine, wherein gear stages can be automatically switched in accordance with a preset map, the lockup clutch of a torque converter is engageable during at least one gear stage, and engine torque is changed during shifting to maintain satisfactory shift characteristics. The engagement is determined not only in response to an engaging signal of the lockup clutch from the computer, but also in consideration of a time lag after the engaging signal is turned ON. Alternatively, engagement is determined by detecting the rotary speeds of the engine and the turbine of the torque converter when the engaging signal is ON. As a result, mistaken determinations of engagement of the lockup clutch are avoided.

4 Claims, 7 Drawing Sheets

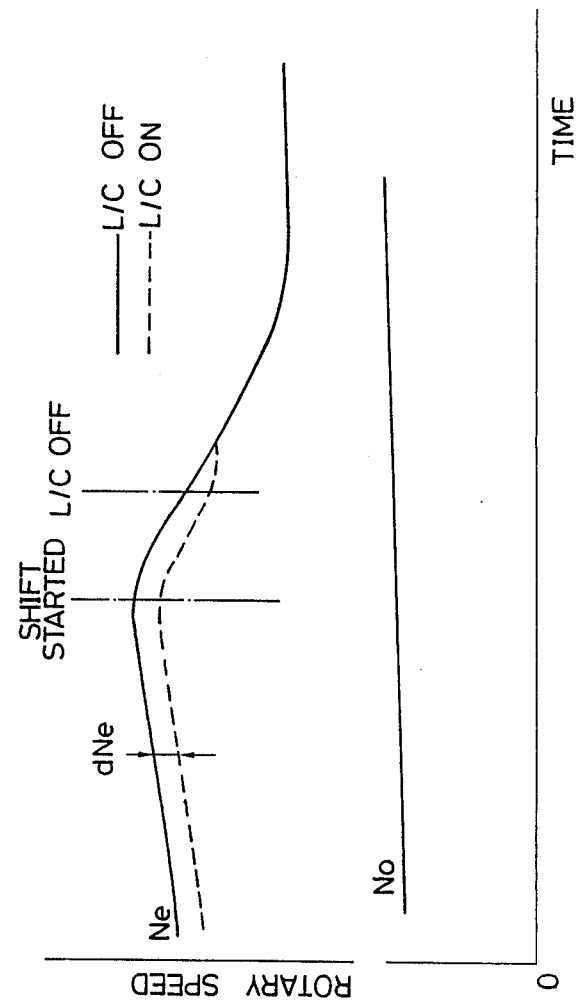

SYSTEM FOR INTEGRALLY CONTROLLING AN ENGINE AND AN AUTOMATIC TRANSMISSION HAVING A DEVICE FOR DETERMINING ENGAGEMENT OF THE LOCKUP CLUTCH WHEN A CERTAIN TIME DURATION ELAPSES AFTER OUTPUT OF AN ENGAGEMENT SIGNAL

BACKGROUND OF THE INVENTION

This invention relates to a device for determining engagement of a lockup clutch, particularly to a device for determining engagement of a lockup clutch in a system for integrally controlling an automatic transmission and an engine, wherein gear stages can be automatically switched in accordance with a present shift map, the lockup clutch of a torque converter can be engaged on at least one gear stage, and the engine torque is changed during shifting to maintain satisfactory shift characteristics.

Automatic transmissions comprising gear transmission mechanisms, a plurality of frictionally engaging devices, and hydraulic pressure control devices operated to selectively switch the engagements of the frictionally engaging devices, so that any one of a plurality of gear stages can be achieved in accordance with a preset shift map, are well known in the transmission art.

Furthermore, in vehicle automatic transmissions of the type described, various systems for integrally controlling an automatic transmission and an engine, wherein engine torque is changed during shifting to obtain satisfactory shift characteristics and durability of the frictionally engaging devices have been used (For example, Japanese Patent Laid-Open No. 69738/1980). More specifically, systems of this type change that the amount of torque transmitted from the engine during shifting and control the amount of absorbed energy in various members in the automatic transmission or in the frictionally engaging devices for controlling these members to complete shifting within a short period of time with low shift shock. As a consequence, satisfactory shift feeling is given to a driver and durability of the frictionally engaging devices is improved.

Furthermore, motor vehicle automatic transmissions implementing a torque converter lock up clutch during part of all of the gear stages to improve the fuel consumption rate, are also well known in the transmission art.

Integral controls for automatic transmissions which have a lockup clutch and an engine previously have not determined how engine torque should change in accordance with engaged or non-engaged states of the lockup clutch. However, engine torque chang timing must be accurately performed. Movements of members of the automatic transmission are considerably different depending on either the engaged or non-engaged states of the lockup clutch. As a consequence, in determining the engine torque change timing, it is desirable to alter the method of determining the timing depending on the engaged or the non-engaged states of the lockup clutch.

For example, when the engine torque change timing is determined by use of a timer, the value of the timer should be changed depending on either the engaged or non-engaged states of the lockup clutch.

Furthermore, when the engine torque change timing is determined by the actual movements of members of the engine or the automatic transmission, it is desirable to change the method of determining such timing. Namely, in the case of an up-shifting from the non-engaged state of the lockup clutch, it is desirable to determine whether or not the engine rotary speed is lower than the precedingly measured value. Whereas, in the case of an up-shifting from the engaged state of the lockup clutch, it is desirable to determine whether or not the enging rotary speed is lower than a turbine rotary speed of the torque converter, which is obtained from the output shaft rotary speed and the gear ratio on the low gear side. According to the above-described methods, the engine torque change timing can be determined early and reliably.

However, in automatic transmission lockup mechanisms, in general, a lockup piston is engaged under oil pressure. Furthermore, engagement and disengagement are preformed by switching oil lines by ON-OFF operated electromagnetic valves in response to engaging signals from a microcomputer. As a consequence, there is some time delay between the engaging signal which is outputted from the microcomputer and the actual engagement. As a result, there occurs a timewise deviation between an engagement determination made in response to the engaging signal of the microcomputer and the actual engaged state of the lockup clutch.

More specifically, although the microcomputer determines that the lockup clutch is in the engaged state, there are instances where the lockup clutch is not actually engaged. When a shifting takes place in the above-described case, when the method of determining the engine torque change timing is differed depending on either the engaged or non-engaged states of the lockup clutch as aforesaid, determination of the timing for performing the engine torque change control cannot be performing properly. As a result, the torque change control is carried out at an unsuitable time.

SUMMARY OF THE INVENTION

The present invention has been developed to obviate the above-described disadvantages and has as its object the provision of a device for determining engagement of a lockup clutch in a system for integrally controlling an automatic transmission and an engine, wherein even if the determination of engagement of the lockup clutch in the microcomputer and the actual engagement of the lockup clutch differ, the torque change control can be performed at the suitable timing at all times.

To achieve the above-described object, as the technical illustration thereof is shown in FIG. 1(A), a first aspect of the present invention comprises: apparatus for determining whether or not a signal for engaging the lockup clutch is being outputted; apparatus for determining a predetermined time duration after the engaging signal is outputted; and apparatus for determining that the lockup clutch is engaged when the engaging signal is outputted and the predetermined time duration elapses after the output of the engaging signal.

To achieve the above-described object, as the technical illustration thereof is shown in FIG. 1(B), a second aspect of the present invention comprises: apparatus for detecting whether or not a signal for engaging the lockup clutch is outputted; apparatus for determining the rotary speed of the torque converter turbine; apparatus for detecting the engine rotary speed; and apparatus for determining that the lockup clutch is engaged when the engaging signal is outputted and the turbine rotary speed and the engine rotary speed are equal to each other.

This action will be described in detail with reference to FIG. 6.

FIG. 6 (A) shows the characteristics of an engine rotary speed Ne and an output shaft rotary speed No of the automatic transmission at the time of an up shift. A solid line indicates the case where the lockup clutch is non-engaged, and a broken line indicates the case where the lockup clutch is engaged. since the shift point in the automatic transmission is generally determined by the output shaft rotary speed (vehicle speed) and the throttle opening (engine load) where the same shift point is used, the engine rotary speed Ne is higher by an amount corresponding to the slip dNe of the torque converter when the lockup clutch is non-engaged.

When shifting starts, the engine rotary speed Ne beings to decrease. When shifting is started from the engaged state of the lockup clutch, the lockup clutch is disengaged during shifting to reduce the shift shocks, whereby thereafter the engine rotary speed Ne comes to be the same as in the non-engaged state of the lockup clutch. FIG. 6 (B) shows the change of the engine rotary speed Ne at the start of the shifting in more detail. As described above, in the case of the shifting when the lockup clutch is non-engaged, the start of the shifting is determined when the engine rotary speed Ne (solid line) is continuously lower than before as described above. If the start of the shifting is determined when the engine rotary speed Ne (solid line) is lower than before, for example three times, in order to a void mistaken detection, then the start of the shifting can be judged at a point A3. On the other hand, in the case of the shifting when the lockup clutch is engaged, a turbine rotary speed NT obtained by multiplying the output shaft rotary speed No by the gear ratio p on the low gear side is compared with the engine rotary speed Ne. Because of this, the start of the shifting can be determined at a point B3, for example. In either way, the start of the shift can be determined considerably early, and no trouble occurs in particular.

However, when the lockup clutch is not actually engaged while the lockup clutch engaging signal of the computer is ON, if the engagement of the lockup signal is determined only by the engaging signal of the computer, then the turbine rotary speed NT (No×p) is compared with the engine rotary speed Ne which is still in the state of the solid line, resulting in a delay in the detection of the start of the shifting to a point C3. In the engine torque change control, it is necessary to perform the torque change as early as possible after the start of the shifting. As a consequence, as detection of the start of the shifting is delayed as described above, the advantage attained by the engine torque change control is not fully obtained. According to the first and second aspects of the present invention, the actual state of the lockup clutch can be accurately recognized by timer means or by states of actual rotary speed, so that the above-described disadvantages can be prevented from occurring.

In a preferable embodiment of the first aspect of the present invention the predetermined time duration can be changed in accordance with at least one parameter of an engine load, an engine rotary speed, oil temperature of the automatic transmission and a type of shifting. With this arrangement, engagement determination of the lockup clutch can be made more precisely.

In preferable embodiment of the second aspect of the present invention the turbine rotary speed can be determined by calculations between the output shaft rotary speed of the automatic transmission and the gear ratio. With this arrangement, the turbine rotary speed sensor can be eliminated and the detected value obtained by the existing output shaft rotary speed sensor of the automatic transmission can be utilized, so that the costs can be reduced.

BRIEF DESCRIPTION OF THE DRAWINGS

The above objects, features and advantages of the present invention, as well as other objects and advantages thereof, will become more apparent from the description of the invention which follows, taken in conjunction with the accompanying drawings, wherein like reference characters designate the same or similar parts and wherein:

FIGS. 6A and 6B are charts illustrating the disadvantages when the determination of the engagement of the lockup clutch is not performed properly.

DESCRIPTION OF THE PREFERRED EMBODIMENT

The present invention will be described in detail with reference to the accompanying drawings which illustrate preferred embodiments of the present invention.

Figure 1A:
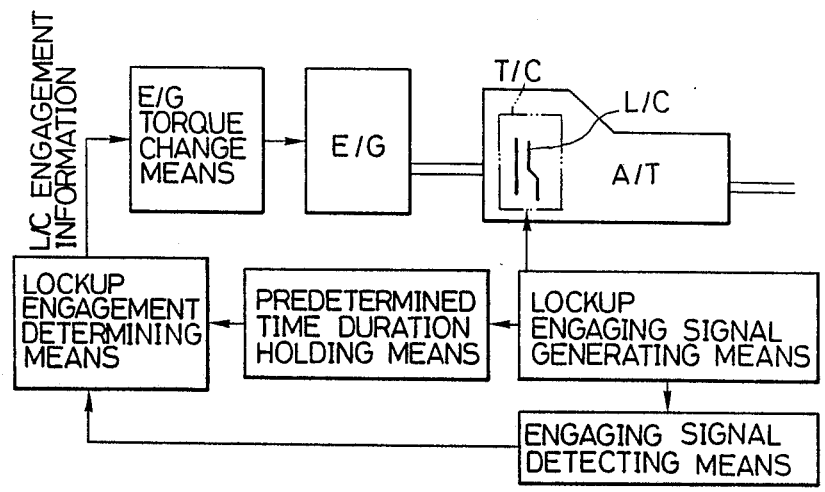
FIGS. 1 (A) and (B) are block diagrams showing the technical illustration of the first and second aspects of the present invention, respectively.
Figure 1B:
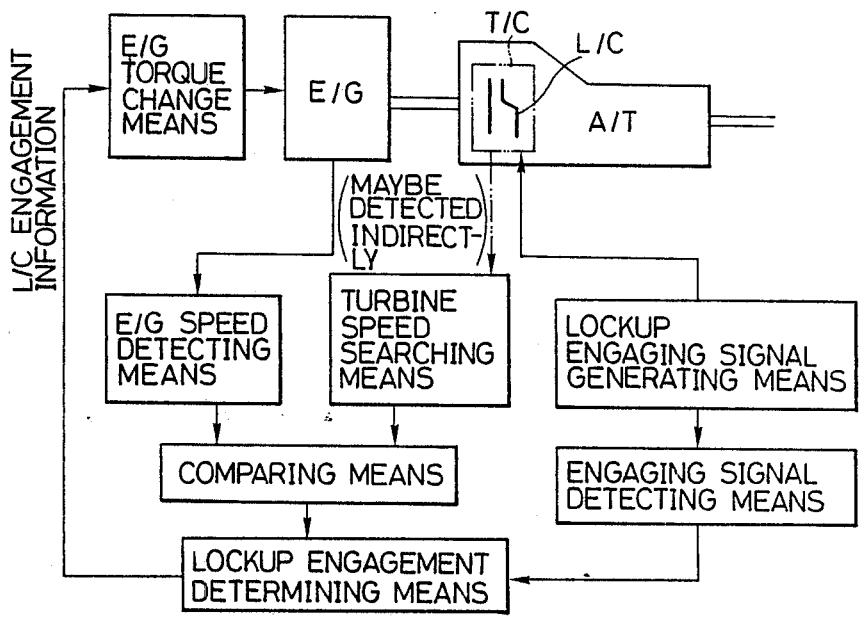
Figure 2:
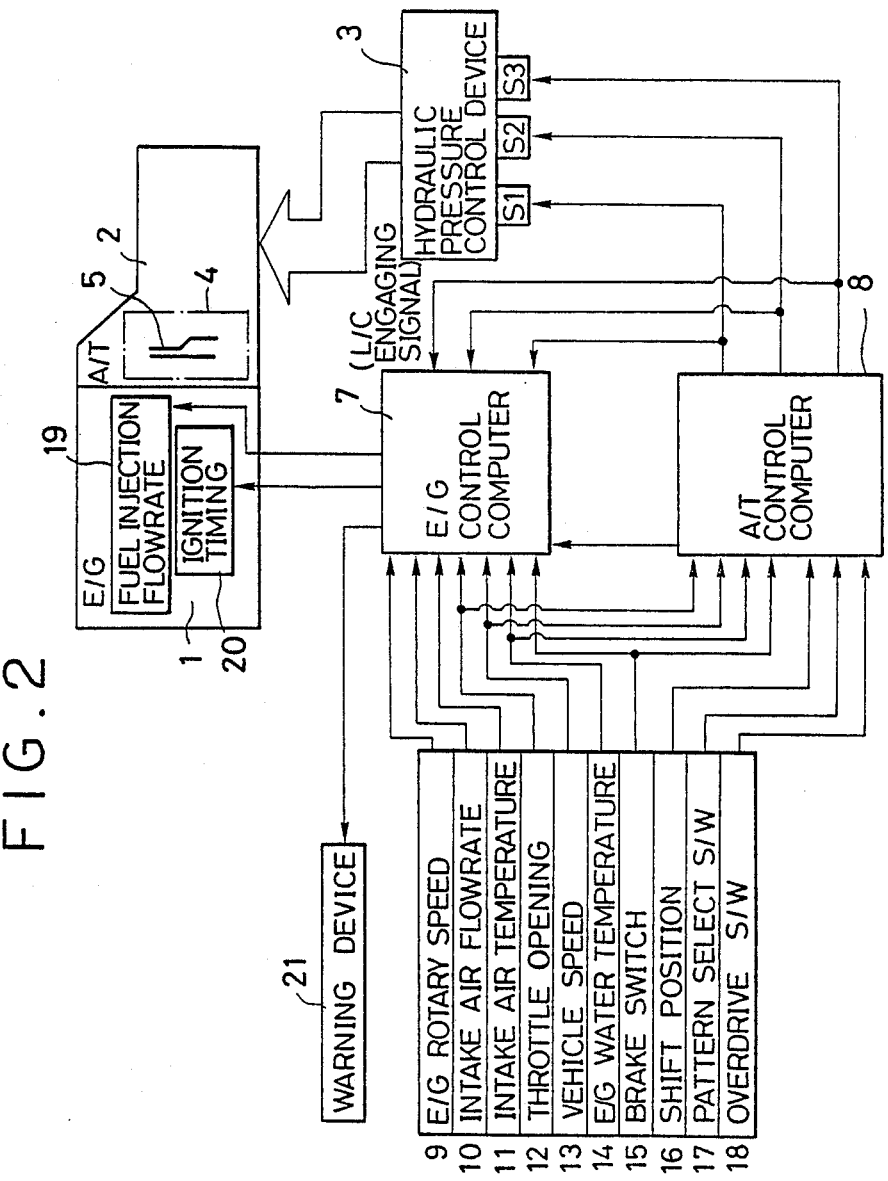
FIG. 2 is a block diagram generally showing the arrangement of one embodiment of the system for integrally controlling an automatic transmission and an engine according to the present invention.

FIG. 2 is a block diagram showing the general arrangement of the system for integrally controlling an automatic transmission and an engine, to which the present invention is applied.

An engine 1 and an automatic transmission 2 are of types well known. In the engine 1, fuel injection flowrate at an injector 19 and an ignition timing at a distributor 19 are controlled by an engine control computer 7, so that engine output in connection with throttle opening and engine rotary speed can be obtained. In the automatic transmission 2, electromagnetic valves S1–S3 are controlled by an automatic transmission control computer 8, and oil lines in a hydraulic pressure control device 3 are changed whereby the engagements of frictionally engaging devices are selectively changed, so that a gear stange in connection with vehicle speed and throttle opening can be obtained.

The automatic transmission 2 provides a torque converter 4 with a lockup clutch 5. The lockup clutch 5 in the torque converter 4 directly connects the engine side with the automatic transmission side (turbine). Electromagnetic valves S1–S3 (S3 is for engaging the lockup clutch) of a hydraulic control device 3 are controlled by an automatic transmission control computer 8. As a result, oil lines in the hydraulic control device 3 are changed and the engaged states of the lockup clutch 5 and the frictionally engaging devices are selectively changed, so that a gear stage in connection with the vehicle speed and the throttle opening can be obtained. Furthermore, a so-called directly connected running with engagement of the lockup clutch can be performed by a specific gear stage.

More specifically, the engine control computer 7 receives signals of engine rotary speed from an engine rotary speed sensor (crank angle sensor) 9, intake air flowrate from an air flow meter 10, intake air temperature from an intake air temperature sensor 11, throttle opening from a throttle sensor 12, vehicle speed from a vehicle speed sensor 13, engine water temperature from a water temperature sensor 14, and brake-ON signal from a brake switch 15. The engine control computer 7 determines the fuel injection flowrate and the ignition timing in response to the above-mentioned signals. Furthermore, the solenoid signals of the ON-OFF controlled electromagnetic valves S1–S3 of the automatic tranmission control computer 8 is input in parallel into the engine control computer 7, whereby the engine control computer 7 determines shift timing of the automatic transmission, and carries out the engine torque change by lag angle control.

On the other hand, the automatic transmission control computer 8 receives signals from: the throttle sensor 12, the vehicle speed sensor 13, the water temperature sensor 14, the brake switch 15, and further, signals of position of a shift lever from a shift position sensor 16, running selection pattern such as a fuel consumption running mode and a power performance running mode from a pattern select switch 17, permission of a shift to overdrive from an overdrive switch 18, whereby the electromagnetic valves S1–S3 are ON-OFF controlled so that a gear stage in connection with the vehicle speed and the accelerator opening can be obtained.

Figure 3:
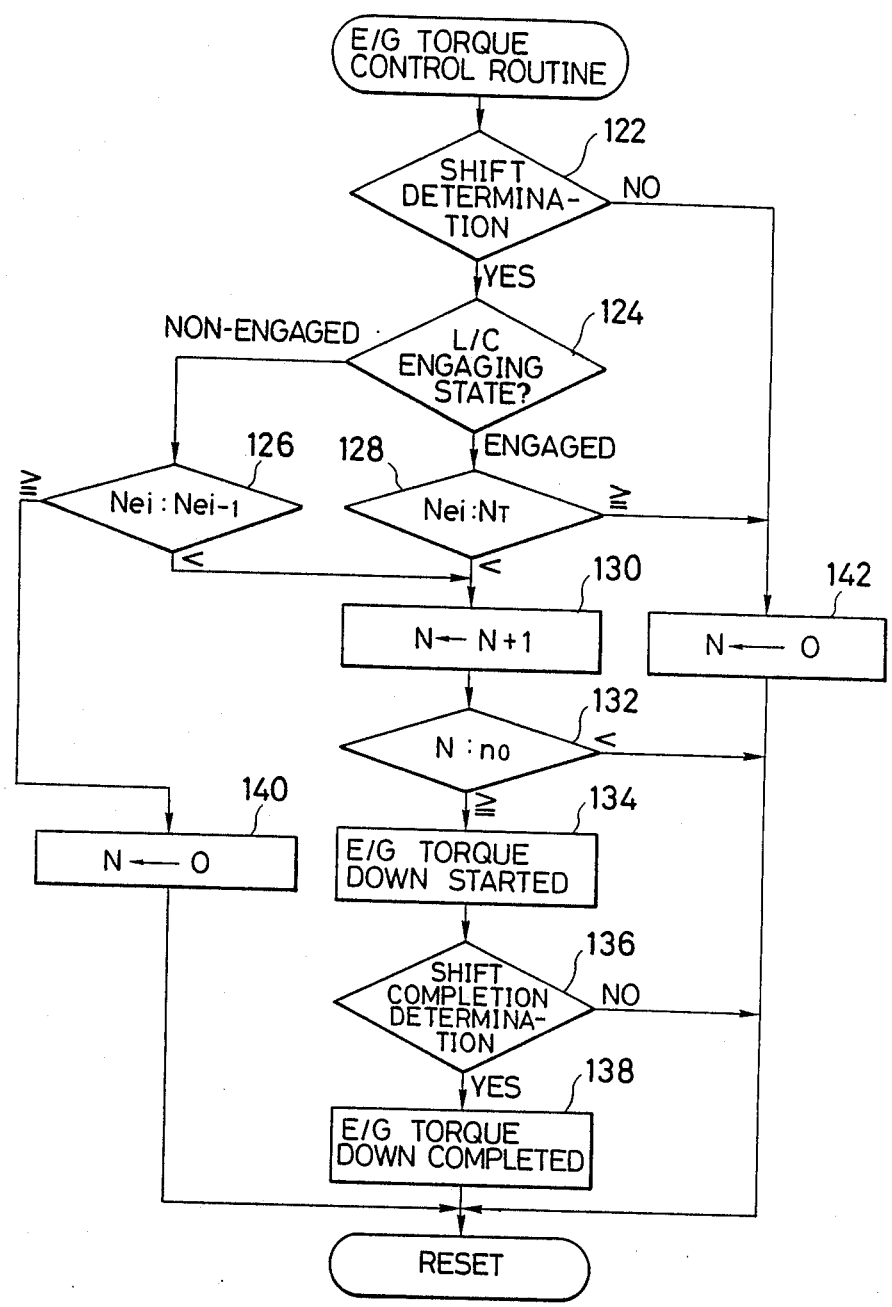
FIG. 3 is a flow chart showing an engine torque control routine adopted in the system of the above embodiment.

FIG. 3 is the flow chart showing the outline of integral control of the engine and the automatic transmission while the transmission is up shifting.

In the control routine of the engine control computer 7, occurrence of a shifting is determined from a change in signals of the electromagnetic valves S1–S3 (Step 122). When occurrence of a shifting is determined, the engagement state of the lockup clutch is determined (Step 124: will be described in detail hereunder). When the lockup clutch is in the non-engaged state, an engine rotary speed Nei at the present time is compared with an engine rotary speed Nei−1 at the precedng time (Step 126). When Nei≧Nei−1, a count N is cleared (Step 140). When Nei >Nei−1, i.e. the engine rotary speed is lowered, the commencement of shifting is determined and the routine proceeds to Step 130. On the other hand, when the lockup clutch is engaged, the turbine rotary speed NT determined from the output shaft rotary speed No and the gear ratio p on the low gear side is compared with the engine rotary speed Nei at the present time (Step 128). When Nei≧NT, it is determined that the gear ratio p on the low gear side is maintained (i.e., shifting has not yet started), and the count N is cleared (Step 142). When Nei >NT, i.e., the engine rotary speed Nei is smaller than the turbine rotary speed NT, it is determined that the gear ratio p' begins to be changed into a gear ratio p on the high gear side (i.e., shifting has started), and the routine proceeds to Step 130.

In Step 130, the value of the count N is incremented. Subsequently, the value of the count N is compared with a predetermined number of times n0 (Step 132). When N >n0, the flow is reset as it is. However, when N≧n0, i.e. Nei<Nei−1 or Nei <NT continuously occurs n0 times or more, it is determined that the actual shifting has started without erroneous detection, and the engine torque change commences (Step 134). As the shifting progresses and when the engine rotary speed is changed to a rotary speed NeA obtained by adding a predetermined value to the engine rotary speed NeB at the time of completion of the shifting, NeB being obtained from the output shaft rotary speed No and the gear ratio p' on the high gear side, completion of the shifting is determined (Step 136). Thereafter, the engine torque control is ended slowly taking a predetermined time duration, and the engine control is restored to the normal state (Step 138).

The lockup clutch engagement determination control in Step 124 in FIG. 3 will be described in detail with reference to FIGS. 4 and 5.

Figure 4:
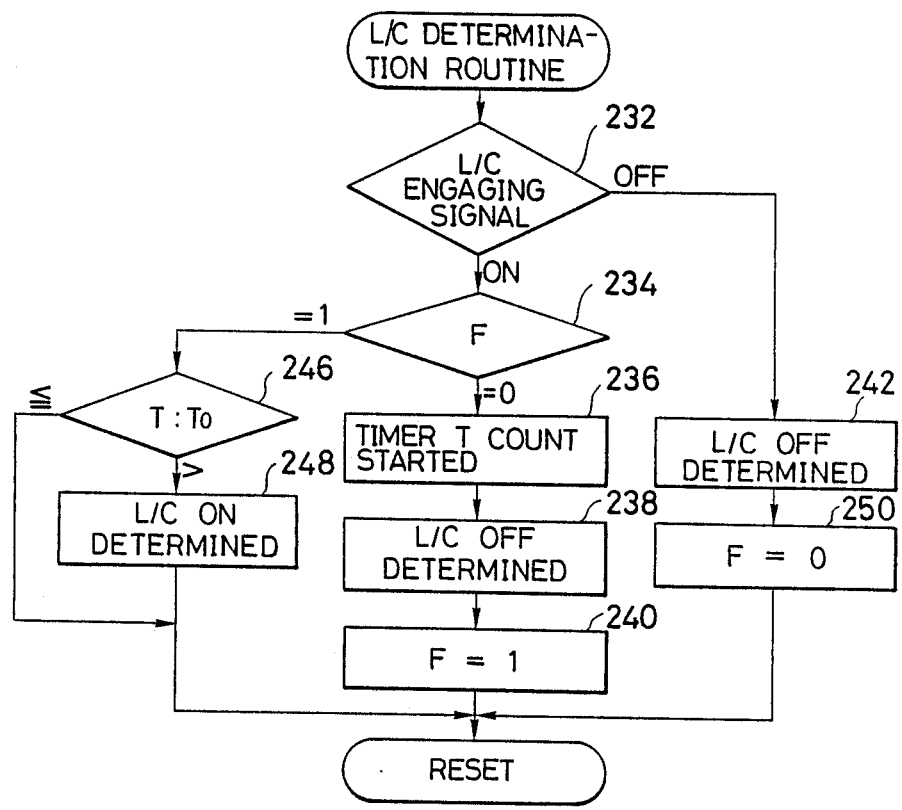
FIGS. 4 and 5 are flow charts showing a lockup determination routine.

FIG. 4 shows the determination of lockup clutch engagement based upon the lapse of a predetermined time duration T after the lockup engaging signal is turned ON.

First, the state of the engaging signal of the lockup clutch (signal of electromagnetic valve S3) is detected (Step 232). When the engaging signal is OFF, it is determined that the lockup clutch is non-engaged immediately (Step 242). Then a flag F for a timer is set to zero (Step 250). When the engaging signal is ON, the flag F for the timer is determined (Step 234). When F=0, a count for a timer T to count an elapsed time is started (Step 236), and it is determined that the lockup clutch is non-engaged in Step 238, and further, the flag F is set to 1 is Step 240. On the other hand, when F=1 in Step 234, the routine proceeds to Step 246. In Step 246, the value T of the timer is compared with a predetermined time duration T0. When T≦T0, i.e. the predetermined time duration T0 does not elapse, the flow is reset as it is and the determination that the lockup clutch is non-engaged is maintained. However, when T>T0, i.e. the predetermined time duration elapses, lockup clutch engagement is determined (Step 248). Incidentally, it is desirable that the predetermined value T0 is changed in accordance with the throttle opening (engine load), oil temperature of the automatic transmission, the engine rotary speed, the type of shifting and the like, to coincide as closely as possible with the actual time duration required for an engagement. In general, the larger the throttle opening is, the higher the oil temperature of the automatic transmission is, and the higher the engine rotary speed is, the longer time duration required for the engagement should become. Furthermore, as for the types of shifting, the trends thereof are different with individual motor vehicles.

Figure 5:
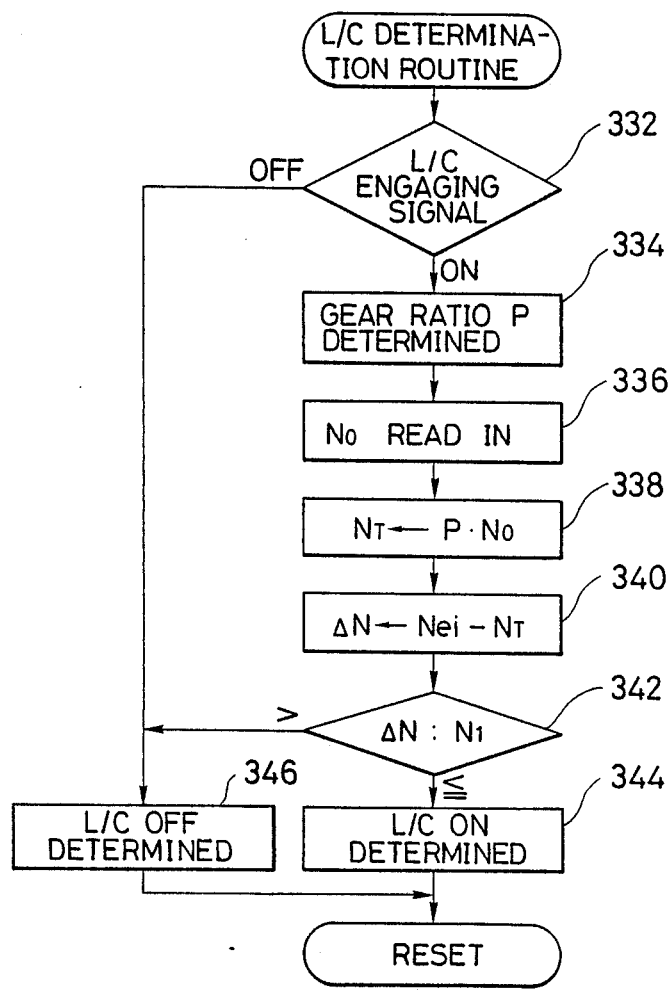
Figure 6B:
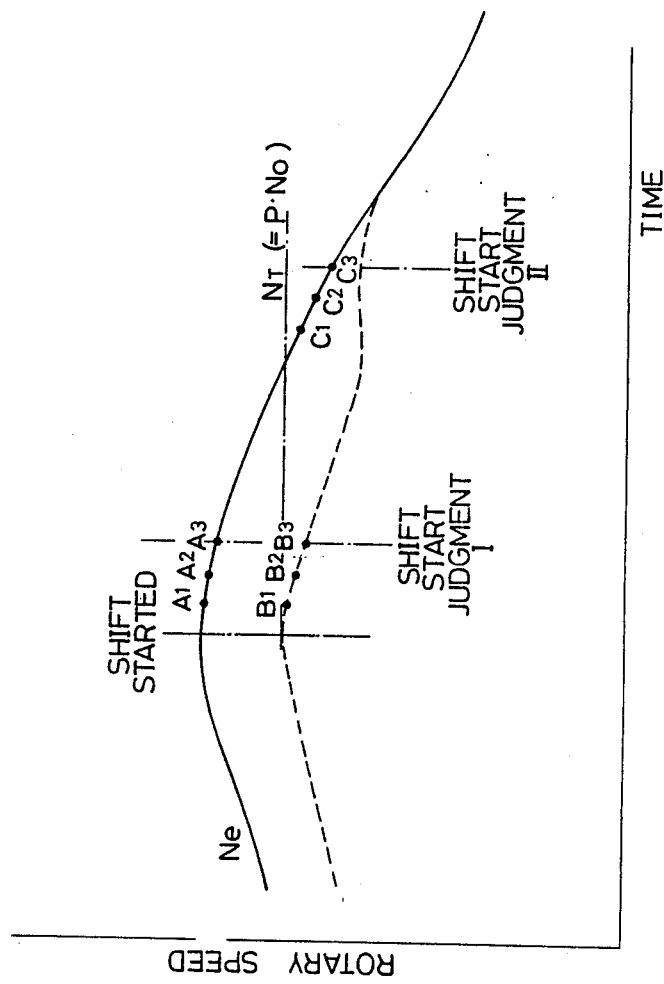

In FIG. 5, engagement determination of the lockup clutch is determined from the actual rotary speed.

First, the state of the lockup clutch engaging signal is detected (Step 332). When the engaging signal is OFF, it is immediately determined that the engaging signal is non-engaged (Step 346). When the engaging signal is ON, the gear stage of the transmission is sensed from the combination of the electromagnetic valves S1, S2 and the gear ratio p on the low gear side is determined (Step 334). Thereafter, the output shaft rotary speed No is read in (Step 336), and $NT = No \cdot p$ are calculated to determine the turbine rotary speed NT (Step 338). Subsequently, dN (an amount corresponding to a slip of the torque converter 4) obtained by subtracting the turbine rotary speed NT from the engine rotary speed Nei at the present time is calculated (Step 340), and this dN is compared with a predetermined N1 (Step 342). When dN >N1, a considerable slip occurs, whereby it is determined that the lockup clutch is non-engaged (Step 346). When dN≦N1, there is minimal slip by the torque converter, whereby it is determined that the lockup clutch is in engagement (Step 344). In this embodiment, the actual engaged state of the lockup clutch can be accurately sensed. As a result, the timing of the engine torque change control can be accurately detected. As a consequence, the advantages attained by performing the engine torque change, such as the improvement in the durability of the frictionally engaging devices and the effect of decreased shift shocks can be maximized.

It is noted that it is unavoidable that a fine difference occured between the rotary speed of the engine and the turbine is detected due to some slip still occurring, even in the lockup engaging state, and due to errors in detection in the both rotary speed sensor systems. As a consequence, when only the aforesaid fine difference occurs, as in Step 342 in the embodiment of FIG. 5, it should be determined that both rotary speeds are equal to each other.

What is claimed is:

1. A system for integrally controlling an engine and an automatic transmission with a lock-up clutch, wherein said system includes means for automatically switching gear stages for automatically shifting gears in accordance with a preset shift map, means for outputting an engaging signal to engage said lockup clutch of a torque converter for engaging said lock-up clutch during at least one gear stage, and torque change control means for changing engine torque during shifting based on whether the lock-up clutch is engaged to maintain satisfactory shift characteristics, said system comprising:

means for sensing output of the engaging signal for engaging said lockup clutch;
   means for determining a predetermined time duration after said engaging signal is outputted; and
   means for determining that said lockup clutch is engaged when said engaging signal is outputted and said predetermined time duration elapses after the output of said engaging signal to determine an engagement state of the lock-up clutch.

2. The device as set forth in claim 1, further comprising:

means for detecting at least one parameter of an engine load, an engine rotary speed, an oil temperature of the automatic transmission and kinds of shifting from one gear stage to another gear stage. ; and
   means for changing said predetermined time duration in accordance with said at least one parameter.

3. A system for integrally controlling an engine and an automatic transmission, wherein said system includes means for automatically switching gear stages for automatically shifting gears in accordance with a preset shift map, means for outputting an engaging signal to engage said lockup clutch of a torque converter for engaging said lockup clutch during at least one gear stage, and torque change control means for changing engine torque during shifting based on whether the lock-up clutch is engaged to maintain satisfactory shift characteristics, said system comprising:

means for sensing output of the engaging signal for engaging said lockup clutch;
   means for detecting a turbine rotary speed of said torque converter;
   means for detecting an engine rotary speed;
   means for determining whether said turbine rotary speed and said engine rotary speed are substantially equal to each other; and
   means for determining that said lockup clutch is engaged when said engaging signal is outputted and said turbine rotary speed and said engine rotary speed are substantially equal to each other.

4. The device as set forth in claim 3, further comprising:

means for detecting an output shaft rotary speed of the automatic transmission and a gear ratio of the automatic transmission;
   wherein said means for detecting turbine rotary speed determines said turbine rotary speed from said output shaft rotary speed of the automatic transmission and said gear ratio of the automatic transmission.

* * * * *